US007581256B2

(12) United States Patent
Cockerille et al.

(10) Patent No.: US 7,581,256 B2
(45) Date of Patent: Aug. 25, 2009

(54) PROCESS VERIFICATION

(75) Inventors: Warner Cockerille, Sparks, NV (US); Steven G. LeMay, Reno, NV (US); Robert Breckner, Sparks, NV (US)

(73) Assignee: IGT, Reno, NV (US)

( * ) Notice: Subject to any disclaimer, the term of this patent is extended or adjusted under 35 U.S.C. 154(b) by 762 days.

(21) Appl. No.: 10/680,041

(22) Filed: Oct. 6, 2003

(65) Prior Publication Data

US 2004/0068654 A1 Apr. 8, 2004

Related U.S. Application Data

(63) Continuation of application No. 09/925,098, filed on Aug. 8, 2001, now Pat. No. 6,685,567.

(51) Int. Cl.
*G06F 7/06* (2006.01)
*G06F 7/04* (2006.01)

(52) U.S. Cl. ............................ 726/30; 726/22; 726/26; 713/187; 713/193; 463/29

(58) Field of Classification Search .................. 463/29, 463/1, 43; 726/26, 22, 23, 27, 30; 713/187, 713/189, 193, 194; 705/50, 51
See application file for complete search history.

(56) References Cited

U.S. PATENT DOCUMENTS 3,825,905 A 7/1974 Allen, Jr.
3,838,264 A 9/1974 Maker
3,931,504 A 1/1976 Jacoby
4,072,930 A 2/1978 Lucero et al.
4,193,131 A 3/1980 Lennon et al.
4,200,770 A 4/1980 Hellman et al.

(Continued)

FOREIGN PATENT DOCUMENTS

DE 37 00 861 7/1988

(Continued)

OTHER PUBLICATIONS

Benjamin Kosnik, "Notes on the codecvt implmentation", Aug. 28, 2000, pp. 1-7.*

(Continued)

*Primary Examiner*—Kimyen Vu
*Assistant Examiner*—Edward Zee
(74) *Attorney, Agent, or Firm*—Weaver Austin Villeneuve & Samspon LLP

(57) ABSTRACT

A disclosed gaming machine provides methods and apparatus of verifying the authenticity of gaming software stored in and executed from RAM on the gaming machine. When presenting a game on the gaming machine, a master gaming controller may dynamically load gaming software applications into RAM and dynamically unload gaming software applications from RAM. The authenticity of the gaming software applications temporarily stored in RAM may be verified by using methods to compare it with certified gaming software stored on one or more local or remote file storage devices accessible to the master gaming controller on the gaming machine. The verification process may be used to satisfy gaming regulatory entities within various gaming jurisdictions that require certified gaming software to be operating on the gaming machine at all times as well as to prevent tampering with the gaming machine.

27 Claims, 8 Drawing Sheets

U.S. PATENT DOCUMENTS

| | | | | |
|---|---|---|---|---|
| 4,218,582 | A | | 8/1980 | Hellman et al. |
| 4,335,809 | A | | 6/1982 | Wain |
| 4,354,251 | A | | 10/1982 | Hellwig et al. |
| 4,355,390 | A | | 10/1982 | Hellwig et al. |
| 4,405,829 | A | | 9/1983 | Rivest et al. |
| 4,430,728 | A | | 2/1984 | Beitel et al. |
| 4,454,594 | A | | 6/1984 | Heffron et al. |
| 4,458,315 | A | | 7/1984 | Uchenick |
| 4,462,076 | A | | 7/1984 | Smith, III |
| 4,467,424 | A | | 8/1984 | Hedges et al. |
| 4,494,114 | A | | 1/1985 | Kaish et al. |
| 4,519,077 | A | | 5/1985 | Amin |
| 4,525,599 | A | | 6/1985 | Curran et al. |
| 4,558,413 | A | | 12/1985 | Schmidt |
| 4,582,324 | A | | 4/1986 | Koza et al. |
| 4,607,844 | A | | 8/1986 | Fullerton |
| 4,652,998 | A | | 3/1987 | Koza et al. |
| 4,658,093 | A | | 4/1987 | Hellman |
| 4,727,544 | A | | 2/1988 | Brunner et al. |
| 4,752,068 | A | | 6/1988 | Endo |
| 4,759,064 | A | | 7/1988 | Chaum |
| 4,788,637 | A | | 11/1988 | Tamaru |
| 4,817,140 | A | | 3/1989 | Chandra et al. |
| 4,837,728 | A | | 6/1989 | Barrie et al. |
| 4,845,715 | A | | 7/1989 | Francisco |
| 4,848,744 | A | | 7/1989 | Steininger et al. |
| 4,856,787 | A | | 8/1989 | Itkis |
| 4,865,321 | A | | 9/1989 | Nakagawa et al. |
| 4,911,449 | A | | 3/1990 | Dickinson et al. |
| 4,930,073 | A | | 5/1990 | Cina, Jr. |
| 4,944,008 | A | | 7/1990 | Piosenka et al. |
| 4,951,149 | A | | 8/1990 | Faroudja |
| 5,004,232 | A | | 4/1991 | Wong et al. |
| 5,021,772 | A | | 6/1991 | King et al. |
| 5,042,809 | A | * | 8/1991 | Richardson .................. 463/18 |
| 5,050,212 | A | | 9/1991 | Dyson |
| 5,103,081 | A | | 4/1992 | Fisher et al. |
| 5,109,152 | A | | 4/1992 | Takagi et al. |
| 5,146,575 | A | | 9/1992 | Nolan, Jr. |
| 5,155,680 | A | | 10/1992 | Wiedemer |
| 5,155,768 | A | | 10/1992 | Matsuhara |
| 5,161,193 | A | | 11/1992 | Lampson et al. |
| 5,179,517 | A | | 1/1993 | Sarbin |
| 5,224,160 | A | | 6/1993 | Paulini et al. |
| 5,235,642 | A | | 8/1993 | Wobber et al. |
| 5,259,613 | A | | 11/1993 | Marnell |
| 5,283,734 | A | | 2/1994 | Von Kohorn |
| 5,288,978 | A | | 2/1994 | Iijima |
| 5,291,585 | A | | 3/1994 | Sato et al. |
| 5,297,205 | A | | 3/1994 | Audebert et al. |
| 5,326,104 | A | | 7/1994 | Pease et al. |
| 5,342,047 | A | | 8/1994 | Heidel et al. |
| 5,343,527 | A | | 8/1994 | Moore |
| 5,398,932 | A | | 3/1995 | Eberhardt et al. |
| 5,421,006 | A | | 5/1995 | Jablon et al. |
| 5,465,364 | A | | 11/1995 | Lathrop et al. |
| 5,488,702 | A | | 1/1996 | Byers et al. |
| 5,489,095 | A | | 2/1996 | Goudard et al. |
| 5,507,489 | A | | 4/1996 | Reibel et al. |
| 5,586,766 | A | | 12/1996 | Forte et al. |
| 5,586,937 | A | | 12/1996 | Menashe |
| 5,604,801 | A | | 2/1997 | Dolan et al. |
| 5,611,730 | A | | 3/1997 | Weiss |
| 5,643,086 | A | | 7/1997 | Alcorn et al. |
| 5,644,704 | A | | 7/1997 | Pease et al. |
| 5,655,961 | A | | 8/1997 | Acres et al. |
| 5,655,965 | A | | 8/1997 | Takemoto et al. |
| 5,668,945 | A | | 9/1997 | Ohba et al. |
| 5,702,304 | A | | 12/1997 | Acres et al. |
| 5,704,835 | A | | 1/1998 | Dietz, II |
| 5,707,286 | A | | 1/1998 | Carlson |
| 5,725,428 | A | | 3/1998 | Achmuller |
| 5,737,418 | A | | 4/1998 | Saffari et al. |
| 5,741,183 | A | | 4/1998 | Acres et al. |
| 5,742,616 | A | | 4/1998 | Torreiter et al. |
| 5,742,829 | A | | 4/1998 | Davis |
| 5,745,569 | A | | 4/1998 | Moskowitz et al. |
| 5,752,882 | A | | 5/1998 | Acres et al. |
| 5,758,875 | A | | 6/1998 | Giacalone, Jr. |
| 5,759,102 | A | | 6/1998 | Pease et al. |
| 5,761,647 | A | | 6/1998 | Boushy |
| 5,768,382 | A | | 6/1998 | Schneier et al. |
| 5,800,268 | A | | 9/1998 | Molnick |
| 5,800,269 | A | | 9/1998 | Holch et al. |
| 5,809,251 | A | | 9/1998 | May |
| 5,812,857 | A | | 9/1998 | Nelson |
| 5,820,459 | A | | 10/1998 | Acres et al. |
| 5,823,874 | A | | 10/1998 | Adams |
| 5,848,932 | A | | 12/1998 | Adams |
| 5,851,149 | A | | 12/1998 | Xidos et al. |
| 5,863,041 | A | | 1/1999 | Boylan et al. |
| 5,871,400 | A | | 2/1999 | Yfantis |
| 5,876,284 | A | | 3/1999 | Acres et al. |
| 5,879,234 | A | | 3/1999 | Mengual |
| 5,923,885 | A | | 7/1999 | Johnson et al. |
| 5,934,672 | A | | 8/1999 | Sines et al. |
| 5,941,947 | A | | 8/1999 | Brown |
| 5,951,639 | A | | 9/1999 | MacInnis |
| 5,954,583 | A | | 9/1999 | Green |
| 5,971,851 | A | | 10/1999 | Pascal et al. |
| 5,974,454 | A | | 10/1999 | Apfel |
| 5,991,399 | A | | 11/1999 | Graunke et al. |
| 5,999,740 | A | | 12/1999 | Rowley |
| 6,006,034 | A | | 12/1999 | Heath |
| 6,044,471 | A | | 3/2000 | Colvin |
| 6,047,129 | A | | 4/2000 | Frye |
| 6,071,190 | A | | 6/2000 | Weiss et al. |
| 6,074,435 | A | | 6/2000 | Rojestal |
| 6,099,408 | A | | 8/2000 | Schneier et al. |
| 6,104,815 | A | | 8/2000 | Alcorn et al. |
| 6,106,396 | A | | 8/2000 | Alcorn et al. |
| 6,135,887 | A | | 10/2000 | Pease |
| 6,149,522 | A | | 11/2000 | Alcorn et al. |
| 6,163,842 | A | | 12/2000 | Barton |
| 6,165,072 | A | | 12/2000 | Davis et al. |
| 6,195,587 | B1 | | 2/2001 | Hruska et al. |
| 6,203,427 | B1 | | 3/2001 | Walker et al. |
| 6,229,924 | B1 | | 5/2001 | Rhoads et al. |
| 6,243,480 | B1 | | 6/2001 | Zhao et al. |
| 6,253,374 | B1 | | 6/2001 | Dresevic et al. |
| 6,263,497 | B1 | | 7/2001 | Maeda |
| 6,264,557 | B1 | | 7/2001 | Schneier et al. |
| 6,264,561 | B1 | | 7/2001 | Saffari |
| 6,266,810 | B1 | | 7/2001 | Tanaka et al. |
| 6,282,709 | B1 | | 8/2001 | Reha |
| 6,364,769 | B1 | | 4/2002 | Weiss et al. |
| 6,368,219 | B1 | | 4/2002 | Szrek et al. |
| 6,446,211 | B1 | | 9/2002 | Colvin |
| 6,446,257 | B1 | | 9/2002 | Pradhan et al. |
| 6,449,687 | B1 | | 9/2002 | Moriya |
| 6,453,319 | B1 | | 9/2002 | Mattis et al. |
| 6,454,648 | B1 | | 9/2002 | Kelly et al. |
| 6,460,142 | B1 | | 10/2002 | Colvin |
| 6,484,264 | B1 | | 11/2002 | Colvin |
| 6,496,808 | B1 | | 12/2002 | Aiello et al. |
| 6,502,195 | B1 | | 12/2002 | Colvin |
| 6,510,521 | B1 | | 1/2003 | Albrecht et al. |
| 6,527,638 | B1 | | 3/2003 | Walker et al. |
| 6,577,733 | B1 | | 6/2003 | Charrin |
| 6,595,856 | B1 | | 7/2003 | Ginsburg et al. |
| 6,620,047 | B1 | | 9/2003 | Alcorn |
| 6,645,077 | B2 | | 11/2003 | Rowe |
| 6,681,329 | B1 | * | 1/2004 | Fetkovich et al. ........... 713/189 |
| 6,685,567 | B2 | | 2/2004 | Cockerille et al. |

| | | | | |
|---|---|---|---|---|
| 6,785,825 | B2 | 8/2004 | Colvin | |
| 6,792,548 | B2 | 9/2004 | Colvin | |
| 6,792,549 | B2 | 9/2004 | Colvin | |
| 6,795,925 | B2 | 9/2004 | Colvin | |
| 6,799,277 | B2 | 9/2004 | Colvin | |
| 6,804,763 | B1 | 10/2004 | Stockdale et al. | |
| 6,813,717 | B2 | 11/2004 | Colvin | |
| 6,813,718 | B2 | 11/2004 | Colvin | |
| 6,851,607 | B2 | 2/2005 | Orus et al. | |
| 6,857,078 | B2 | 2/2005 | Colvin | |
| 6,863,608 | B1 | 3/2005 | LeMay et al. | |
| 6,931,630 | B1 * | 8/2005 | Cotner et al. | 717/126 |
| 2001/0011341 | A1 | 8/2001 | Hayes Jr. et al. | |
| 2002/0049909 | A1 | 4/2002 | Jackson et al. | |
| 2003/0014639 | A1 | 1/2003 | Jackson et al. | |
| 2003/0028779 | A1 * | 2/2003 | Rowe | 713/180 |
| 2003/0073497 | A1 | 4/2003 | Nelson | |
| 2003/0078103 | A1 | 4/2003 | LeMay et al. | |
| 2003/0195033 | A1 | 10/2003 | Gazdic et al. | |
| 2003/0203755 | A1 | 10/2003 | Jackson | |
| 2003/0203756 | A1 | 10/2003 | Jackson | |
| 2003/0216172 | A1 | 11/2003 | LeMay et al. | |
| 2004/0002381 | A1 | 1/2004 | Alcorn et al. | |
| 2004/0068654 | A1 | 4/2004 | Cockerille et al. | |
| 2004/0147314 | A1 | 7/2004 | LeMay et al. | |
| 2005/0192099 | A1 | 9/2005 | Nguyen et al. | |

FOREIGN PATENT DOCUMENTS

| | | | |
|---|---|---|---|
| DE | 40 14 477 | | 7/1991 |
| EP | 0 685 246 | A1 | 12/1995 |
| EP | 1496419 | A1 | 12/2005 |
| GB | 2 072 395 | | 9/1981 |
| GB | 2 121 569 | | 12/1983 |
| GB | 2 202 984 | | 10/1988 |
| GB | 2 201 821 | | 9/1998 |
| WO | 99-65579 | | 12/1999 |
| WO | WO 00/33196 | | 6/2000 |
| WO | WO 01/50230 | A2 | 7/2001 |
| WO | WO 01/77837 | A1 | 10/2001 |

OTHER PUBLICATIONS

Eddy Zwaneveld, "Definition of Lossless Cloning", Apr. 3, 2000, pp. 1-4.*

Unknown author, "memcmp(3)—compare byte string", Jun. 4, 1993, pp. 1-2.*

Unknown author, "bcmp(3)—byte string operations", Jun. 4, 1993, pp. 1-2.*

Martinek, et al., U.S. Appl. No. 09/520,404 "Encryption in a Secure Computerized Gaming System", filed Mar. 8, 2000. (PA0389.AP. US).

PCT Supplemental Search Report and the Written Opinion dated Jan. 2, 2007, PCT/US2006/034366.

Gaming Standards Association, "Software Verification and Authentication in a Gaming Device", Feb. 15, 2000 www.gamingstandards.com (5 pages).

International Search Report dated Oct. 1, 2002 from related PCT Application No. PCT/US02/25083.

Brosnan, "Using a Gaming Machine as a Server", U.S. Appl. No. 09/595,798, filed Jun. 16, 2000.

LeMay et al., "Gaming Machine Virtual Player Tracking and Related Services," U.S. Appl. No. 09/642,192, filed Aug. 18, 2000.

EPO Supplemental Search Report dated Aug. 23, 2006 in corresponding EP Application No. 02 761 274.6.

Answer and Counterclaims to Second Amended Complaint filed in connection with Civil Action No. CV-S-0 1-1498, pp. 1-26 and certificate of service page, Dec. 12, 2002.

Defendants', Supplemental Response to Plaintiffs' First Set of Interrogatories filed in connection with Civil Action No. CV-S-01-1498, pp. 1-3,50-68 and 85-86, Dec. 2002.

Davida, G. et al., "Defending Systems Against Viruses through Cryptographic Authentication," Proceedings of the Symposium on Security and Privacy, *IEEE Comp. Soc. Press*, pp. 312-318 (May 1, 1989).

Document entitled "Fact Sheet on Digital Signature Standard" dated May 1994, 6 pages.

Federal Information Processing Standards (FIPS) Publication 180-1 entitled "Secure Hash Standard" dated Apr. 17, 1995, 2 title pages, abstract page and pp. 1-21.

Federal Information Processing Standards (FIPS) Publication 180 entitled "Secure Hash Standard" dated May 11, 1993, title page, abstract page and pp. 1-20.

Federal Information Processing Standards (FIPS) Publication 186 entitled "Digital Signature Standard (DSS)" dated Jan. 27, 2000, 17 pages.

Hellman, Martin E., "The Mathematics of Public-Key Cryptography," Scientific American, vol. 241, No. 8, Aug. 1979, pp. 146-152 and 154-157.

Rivest, et al., "A Method for Obtaining Digital Signatures and Public-Key Cryptosystems," Communications of the ACM, vol. 21, No. 2, Feb. 1978, pp. 120-126.

Bauspiess, et al., "Requirements For Cryptographic Hash Functions," *Computers and Security*, 5:427-437 (Sep. 11, 1992).

Complaint for patent infringement filed by Aristocrat Technologies, et al., dated Jan. 22, 2002, Civil Action No. CV-S-02-0091.

Bakhtiari et al., Cryptographic Hash Functions: A Survey, 1995, Centre for Computer Security Research, pp. 1-26.

Schneier B.: "Applied Cryptography, Second Edition. Protocols, Algorithms, and Source Code in C" 1996, John Wiley & Sons, Inc. USA, XP002344241, pp. 446-449; pp. 458-459.

Menezes A., Van Oorschot P., Vanstone S.: "Handbook of Applied Cryptography" 1996, CRC Press, USA, XP002344242, pp. 365-366.

European Search Report dated Sep. 28, 2005, from corresponding EP Application No. 01918440.7 (3 pages).

Spielo Gaming International, www.spielo.com, Dec. 6, 2000.

Oracle Corporation, www.oracle.com/collateral/ent_partioning_fo.pdg, Feb. 1999.

Office Action dated Jul. 18, 2007 for Australian Patent Application No. 2002326526.

International Preliminary Examination Report dated Nov. 26, 2006 from related PCT Application No. PCT/US02/25083.

* cited by examiner

PROCESS VERIFICATION

RELATED APPLICATION DATA

The present application is a continuation of and claims priority under U.S.C. 120 from U.S. patent application Ser. No. 09/925,098, entitled "PROCESS VERIFICATION" filed on Aug. 8, 2001 now U.S. Pat. No. 6,685,567, which is incorporated herein by reference in its entirety for all purposes.

BACKGROUND OF THE INVENTION

This invention relates to gaming machines such as video slot machines and video poker machines. More particularly, the present invention relates to methods of verifying the authenticity of gaming software executed on a gaming machine.

Typically, utilizing a master gaming controller, a gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including touch screens and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional mechanically driven reel slot machines are being replaced with electronic counterparts having CRT, LCD video displays or the like and gaming machines such as video slot machines and video poker machines are becoming increasingly popular. Part of the reason for their increased popularity is the nearly endless variety of games that can be implemented on gaming machines utilizing advanced electronic technology. In some cases, newer gaming machines are utilizing computing architectures developed for personal computers. These video/electronic gaming advancements enable the operation of more complex games, which would not otherwise be possible on mechanical-driven gaming machines and allow the capabilities of the gaming machine to evolve with advances in the personal computing industry.

To implement the gaming features described above on a gaming machine using computing architectures utilized in the personal computer industry, a number of requirements unique to the gaming industry must be considered. One such requirement is the regulation of gaming software. Typically, within a geographic area allowing gaming, i.e. a gaming jurisdiction, a governing entity is chartered with regulating the games played in the gaming jurisdiction to insure fairness and to prevent cheating. Thus, in many gaming jurisdictions, there are stringent regulatory restrictions for gaming machines requiring a time consuming approval process of new gaming software and any software modifications to gaming software used on a gaming machine.

In the past, to implement the play of a game on a gaming machine, a monolithic software architecture has been used. In a monolithic software architecture, a single gaming software executable is developed. The single executable may be burnt onto an EPROM and then submitted to various gaming jurisdictions for approval. After the gaming software is approved, a unique signature can be determined for the gaming software stored on the EPROM using a method such as a CRC. Then, when a gaming machine is shipped to a local jurisdiction, the gaming software signature on the EPROM can be compared with an approved gaming software signature prior to installation of the EPROM on the gaming machine. The comparison process is used to ensure that approved gaming software has been installed on the gaming machine.

A disadvantage of a monolithic programming architecture is that a single executable that works for many different applications can be quite large. For instance, gaming rules may vary from jurisdiction to jurisdiction. Thus, either a single custom executable can be developed for each jurisdiction or one large executable with additional logic can be developed that is valid in many jurisdictions. The customization process may be time consuming and inefficient. For instance, upgrading the gaming software may require developing new executables for each jurisdiction, submitting the executables for reapproval, and then replacing or reprogramming EPROMs in each gaming machine.

Typically, personal computers use an object oriented software architecture where different software objects may be dynamically linked together prior to execution or even during execution to create many different combinations of executables that perform different functions. Thus, for example, to account for differences in gaming rules between different gaming jurisdictions, gaming software objects appropriate to a particular gaming jurisdiction may be linked at run-time which is simpler than creating a single different executable for each jurisdiction. Also, object oriented software architectures simplify the process of upgrading software since a software object, which usually represents only a small portion of the software, may be upgraded rather than the entire software. However, a disadvantage of object oriented software architectures is that they are not very compatible with EPROMs, which are designed for static executables. Thus, the gaming software regulation process described above using EPROM's may not be applicable to a gaming machine employing an object orientated software approach.

Further, in the past, gaming jurisdictions have required that EPROM based software to "run in place" on the EPROM and not from RAM i.e. the software may not be loaded into RAM for execution. Typically, personal computers load executables from a mass storage device, such as a hard-drive, to RAM and then the software is executed from RAM. Running software from an EPROM limits the size of the executable since the storage available on an EPROM is usually much less than the storage available on a hard-drive. Also, this approach is not generally compatible with PC based devices that load software from a mass storage device to RAM for execution.

In view of the above, methods and apparatus for regulating and verifying gaming software stored in and executed from RAM using object oriented software architectures are needed for gaming machines using these architectures.

SUMMARY OF THE INVENTION

This invention addresses the needs indicated above by providing methods and apparatus for verifying the authenticity of gaming software stored in and executed from RAM on a gaming machine. When presenting a game on the gaming machine, a master gaming controller may dynamically load gaming software applications into RAM and dynamically unload gaming software applications from RAM. The authenticity of the gaming software applications temporarily stored in RAM may be verified by using methods to compare it with certified gaming software stored on one or more local or remote file storage devices accessible to the master gaming controller on the gaming machine. The verification process may be used to satisfy gaming regulatory entities within various gaming jurisdictions that require certified gaming software to be operating on the gaming machine at all times as well as to prevent tampering with the gaming machine.

One aspect of the present invention provides a method of verifying the authenticity of a first gaming software program temporarily stored in RAM of a gaming machine having a master gaming controller for executing the gaming software program. The method may be generally characterized as including: (a) identifying the first gaming software program as currently stored in the gaming machine RAM; (b) identifying a second gaming software program stored on a file storage device; (c) comparing at least a first portion of the second gaming software program with a first portion of the first gaming software program as currently stored in the gaming machine RAM, where the first portion of the gaming software program is a portion of the first gaming software program that does not change during execution of the first gaming software program.

In particular embodiments, the first portion of the first gaming software program may include at least a static header of the first gaming software program or at least executable code of the first gaming software program. The second gaming software program may include a substantially identical copy of the executable code of the first gaming software program. In addition, the second gaming software program may be certified for execution on the gaming machine in one or more gaming jurisdictions by a regulatory entity within each of the gaming jurisdictions. The file storage device may located on the gaming machine or at a remote location from the gaming machine. The remote file storage device may be a game server.

In yet other embodiments, the method may include one or more of the following: a) generating an error condition when the first portion of the second gaming software program does not match the first portion of the first gaming software program stored in RAM, b) comparing a plurality of portions of the second gaming software program with a plurality of portions of the first gaming software program as currently stored in the gaming machine RAM, c) generating an error condition when at least one of the plurality of compared portions of the second gaming software program does not match at least one of the plurality of portions of the first gaming software program stored in RAM, d) identifying an executable file name for the first gaming software program, e) identifying the second gaming software program using the executable file name, f) identifying a memory location in RAM of the first gaming software program, g) identifying the first gaming software program from a directory of processes scheduled for execution on the gaming machine, h) selecting the second gaming software program from a list of certified gaming software programs wherein the certified gaming software programs are stored on one or more file storage devices and i) presenting a game of chance on the gaming machine where the game of chance is a video slot game, a mechanical slot game, a lottery game, a video poker game, a video black jack game, a video card game, a video bingo game, a video keno game and a video pachinko game.

Another aspect of the present invention provides a method of verifying the authenticity of a process temporarily stored in RAM of a gaming machine having a master gaming processor for executing the process. The method may be generally characterized as including: (a) identifying a list of processes scheduled for execution on the gaming machine RAM; (b) selecting one process for verification from the list of processes; (c) identifying a file name and current RAM location of the selected process; (d) at the current RAM location, inspecting the selected process to identify at least a first portion of the process, which first portion of the process is a portion of the process that does not change during execution of the process; (e) identifying one or more gaming software programs stored on one or more file storage devices, which gaming software programs have the same name as the selected process; (f) for each of the one or more identified gaming software programs, inspecting the gaming software programs to determine whether at least the first portion of the process is present; and (g) generating a notification if none of the one or more gaming software programs contains the first portion of the selected process.

In particular embodiments, the gaming software programs may be certified for execution on the gaming machine in one or more gaming jurisdictions by a regulatory entity within each of the gaming jurisdictions. The game of chance may be a video slot game, a mechanical slot game, a lottery game, a video poker game, a video black jack game, a video card game, a video bingo game, a video keno game and a video pachinko game. The method may include: 1) presenting a game of chance on the gaming machine, 2) calling an attendant if none of the one or more gaming software programs contains the first portion of the selected process, 3) shutting down the gaming machine if none of the one or more gaming software programs contains the first portion of the selected process Yet another aspect of the present invention provides a method of initializing a gaming system that stores gaming software in RAM on a gaming machine used to present one or more games of chance to a game player. The method may be generally characterized as including: (a) loading a list of gaming software file names from a static memory storage device on the gaming machine; (b) loading a code authenticator program used to compare the list of gaming software file names to names of files stored on a memory storage device on the gaming machine; (c) validating the code authenticator program; (d) comparing the list of gaming software file names with the names of files stored on the memory storage device; (e) when one or more file names on the list of gaming software file names match the names of one or more files stored on the memory storage device, launching the gaming system on the gaming machine.

The method may also include one or more of the following: 1) launching a code comparator program used to compare at least a first portion of a first gaming program temporarily stored in RAM with a first portion of a second gaming software program stored on the memory storage device, 2) when the code authenticator program is not validated, halting the launch of the gaming system on the gaming machine, 3) when one or more file names on the list of gaming software file names does not match the names of one or more files stored on the memory storage device, halting the launch of the gaming system on the gaming machine.

Another aspect of the present invention provides a gaming machine. The gaming machine may be generally characterized as including: 1) a master gaming controller that controls a game of chance played on the gaming machine where the master gaming controller includes: (i) one or more logic devices designed or configured to execute a plurality of gaming software programs used to present the game of chance on the gaming machine and (ii) a RAM that temporarily stores one or more of the plurality of gaming software programs during execution; and 2) gaming logic for comparing a first portion of a first gaming software program as currently stored in the gaming machine RAM with at least a first portion of a second gaming software program. The second gaming software program may be certified for execution on the gaming machine in one or more gaming jurisdictions by a regulatory entity within each of the gaming jurisdictions and may be a substantially identical copy of the first gaming software program. The game of chance is a video slot game, a mechanical slot game, a lottery game, a video poker game, a video black jack game, a video card game, a video bingo game, a video keno game and a video pachinko game.

In particular embodiments, the gaming machine may also include: 1) a file storage device storing the second gaming software program where the file storage device is selected from the group consisting of a hard drive, a CD-ROM drive, a CD-DVD drive and other mass storage devices, 2) gaming logic designed to locate the second gaming software program in a file structure with a plurality of file names and 3) a static memory storage device storing the gaming logic designed to locate the second gaming software program. The static memory storage device may be selected from the group consisting of an EPROM, a flash memory, a non-volatile memory storage device. A list of gaming software file names may also be stored on the static memory storage device where the gaming software files on the list are approved for execution on the gaming machine.

Another aspect of the present invention provides a gaming machine network. The gaming machine network may be generally characterized as including: 1) a plurality of file storage devices storing gaming software programs; 2) a plurality of gaming machines and 3) a network allowing communication between the file storage devices and the plurality of gaming machines. The gaming machines in the game network may be characterized as including: a) a master gaming controller that controls a game of chance played on the gaming machine and b) gaming logic for comparing a first portion of a first gaming software program as currently stored in the gaming machine RAM with at least a first portion of a second gaming software program stored on at least one of the plurality of file storage devices. The master gaming controller in each gaming machine may include (i) one or more logic devices designed or configured to execute a plurality of gaming software programs used to present the game of chance on the gaming machine; and (ii) a RAM that temporarily stores one or more of the plurality of gaming software programs during execution. The network allowing communications between the gaming machines and file storage devices may include the Internet.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1A:
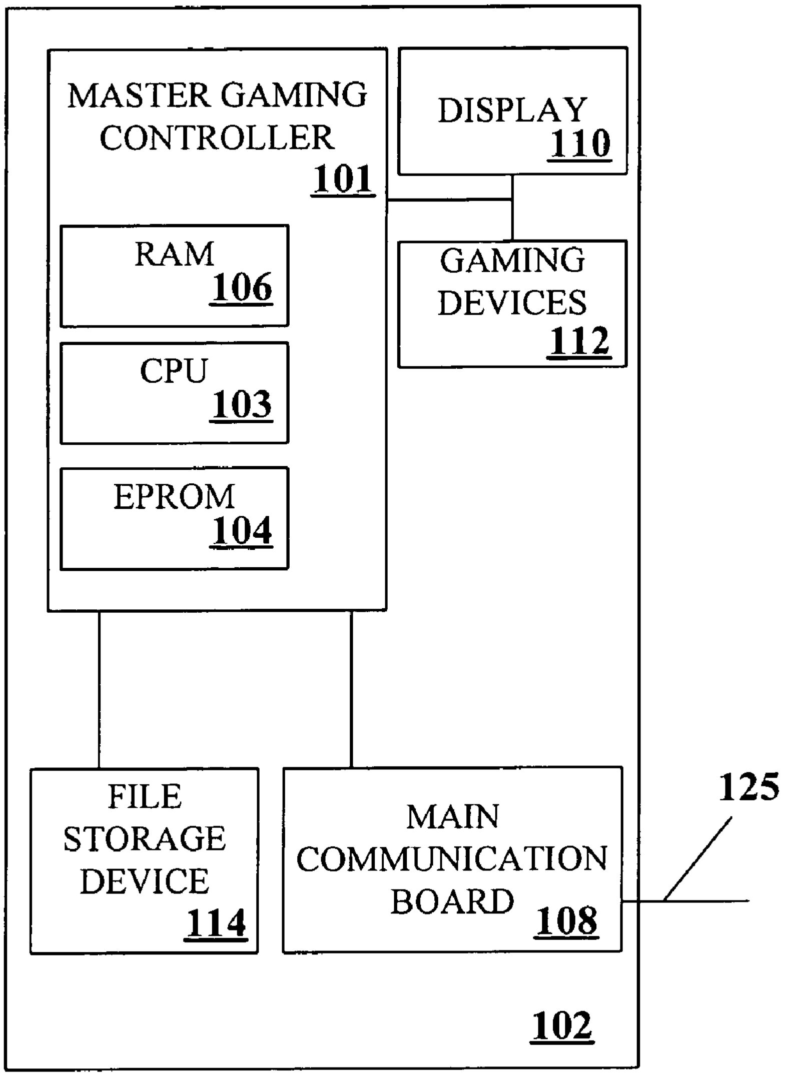
FIG. 1A is block diagram of a gaming machine.

FIG. 1A is block diagram of a gaming machine 102 for one embodiment of the present invention. A master gaming controller 101 is used to present one or more games on the gaming machine 102. The master gaming controller 101 executes a number of gaming software programs to operate gaming devices 112 (see FIG. 2) such as coin hoppers, bill validators, coin acceptors, speakers, printers, lights, displays (e.g. 110) and input mechanisms. One or more displays, such as 110, may be used on the gaming machine. The one or more displays may be mechanical displays (e.g., slot reels), video displays or combinations thereof. The master gaming controller 101 may execute gaming software enabling complex graphical renderings to be presented on one or more displays that may be used as part of a game outcome presentation on the gaming machine 102. The master gaming controller 101 may also execute gaming software enabling communications with gaming devices located outside of the gaming machine 102, such as player tracking servers and progressive game servers. In some embodiments, communications with devices located outside of the gaming machine may be performed using the main communication board 108 and network connection 125.

Figure 3:
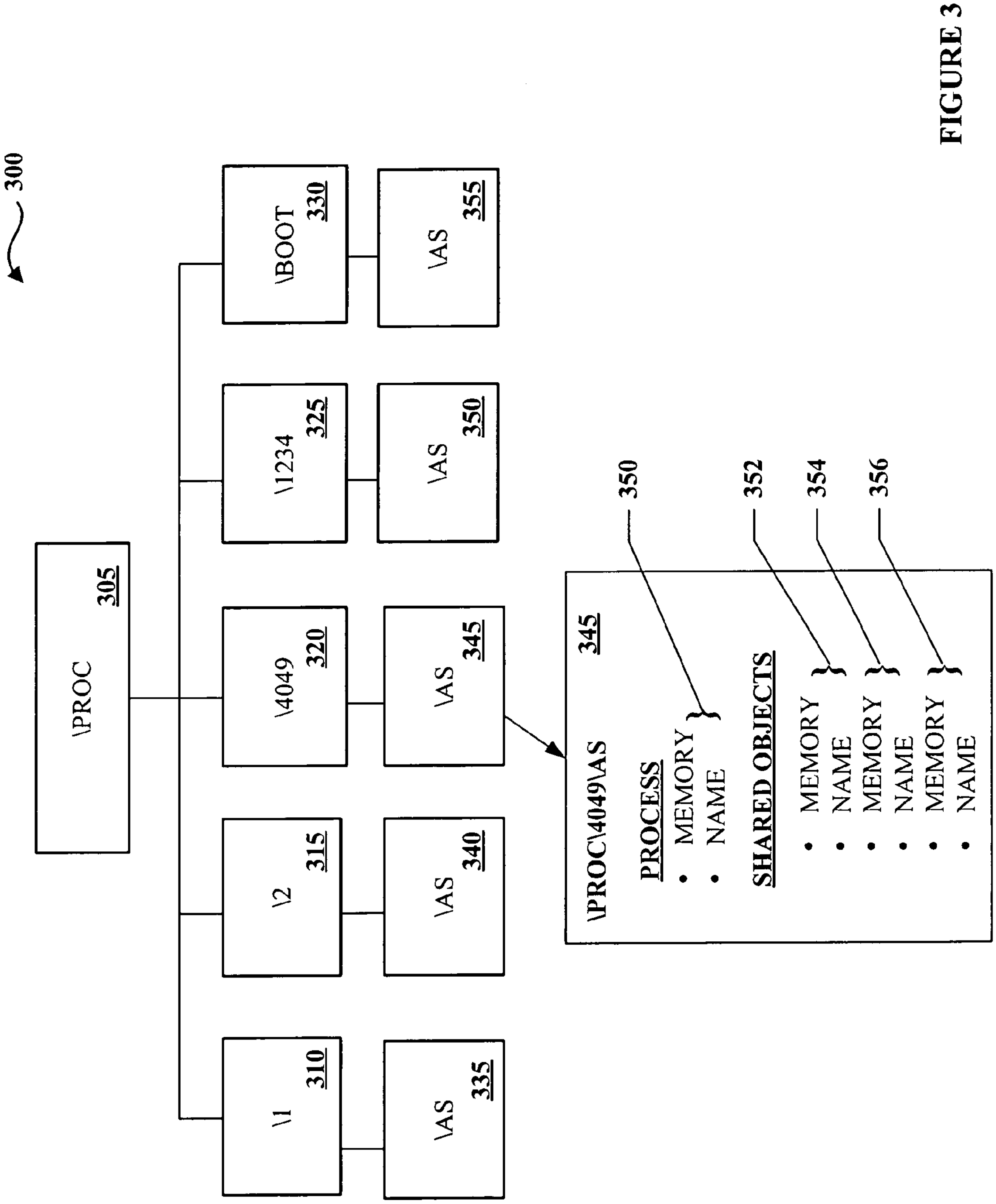
FIG. 3 is a block diagram of a gaming process file structure.
Figure 4:
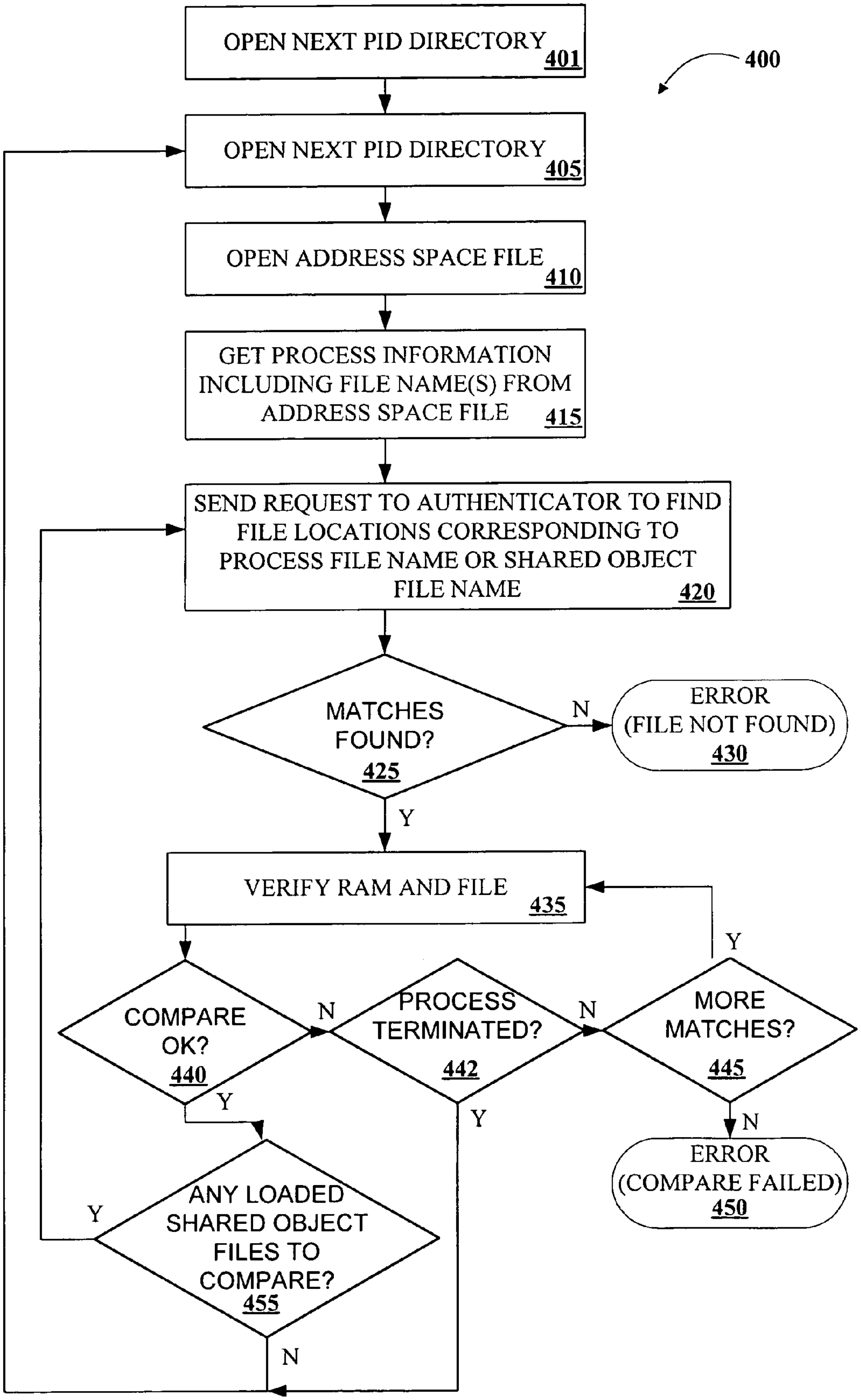
FIG. 4 is a flow chart depicting a method of verifying the authenticity of a process temporarily stored in RAM.
Figure 5:
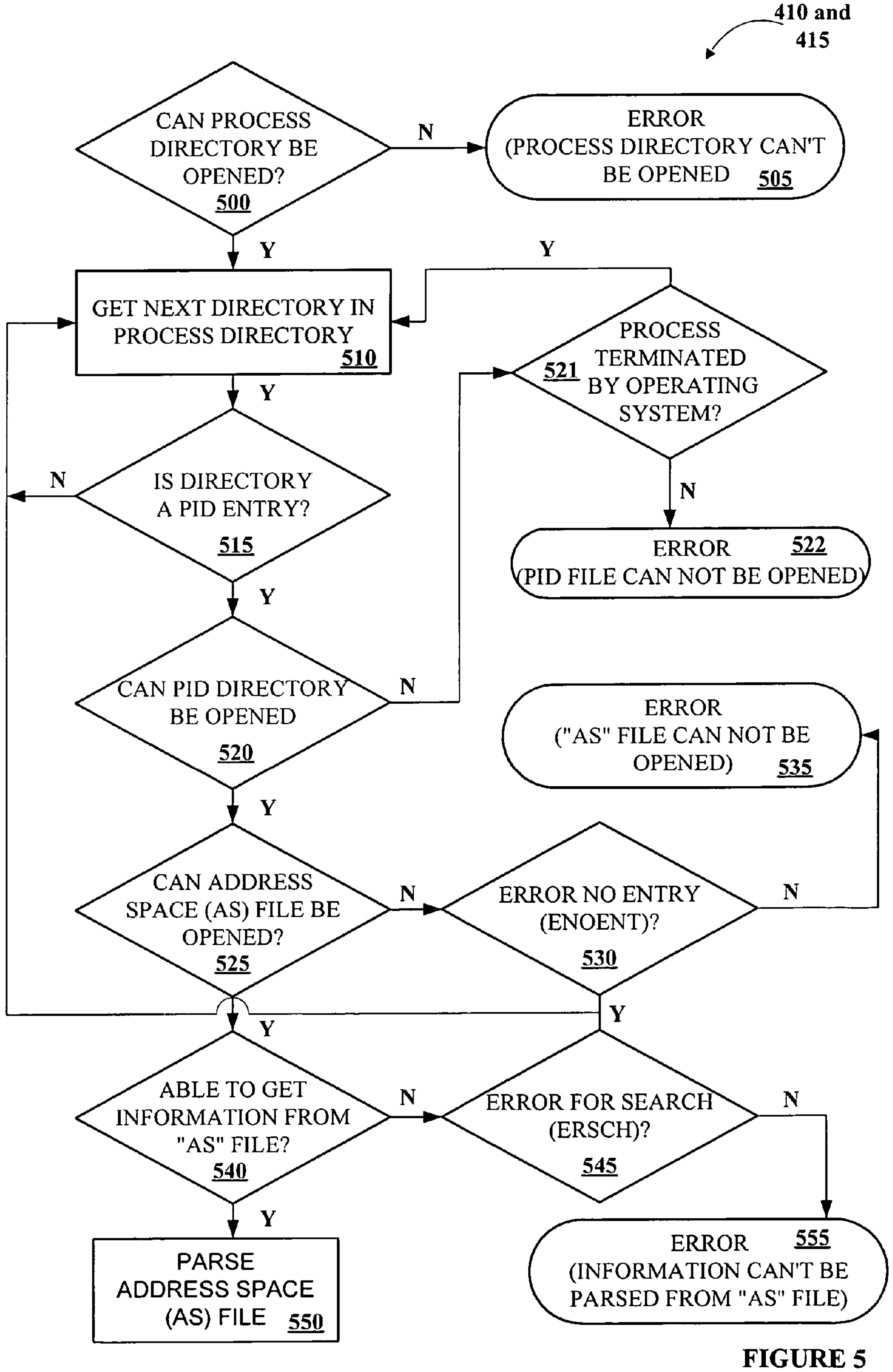
FIG. 5 is a flow chart depicting a method of parsing an address space (AS) file.

In the present invention, for both security and regulatory purposes, gaming software executed on the gaming machine 102 by the master gaming controller 101 is regularly verified by comparing software stored in RAM 106 for execution on the gaming machine 102 with certified copies of the software stored on the gaming machine (e.g. files may be stored on file storage device 114), accessible to the gaming machine via a remote communication connection or combinations thereof. Two gaming software units are used to implement this method: 1) a code comparator and 2) a code authenticator. The code comparator, described in more detail with respect to FIGS. 3, 4 and 5 compares at least some portion of the gaming software scheduled for execution on the gaming machine at a particular time with authenticated gaming software stored in a file storage media accessible to the gaming machine 102. The file storage media may comprise one or more file storage devices, such as 114, located on the gaming machine 102, on other gaming machines, on remote servers or combinations thereof. During operation of the gaming machine, the code comparator frequently checks the gaming software programs being executed by the master gaming controller 101 as the gaming software programs executed by the master gaming controller 101 may vary with time.

Figure 6:
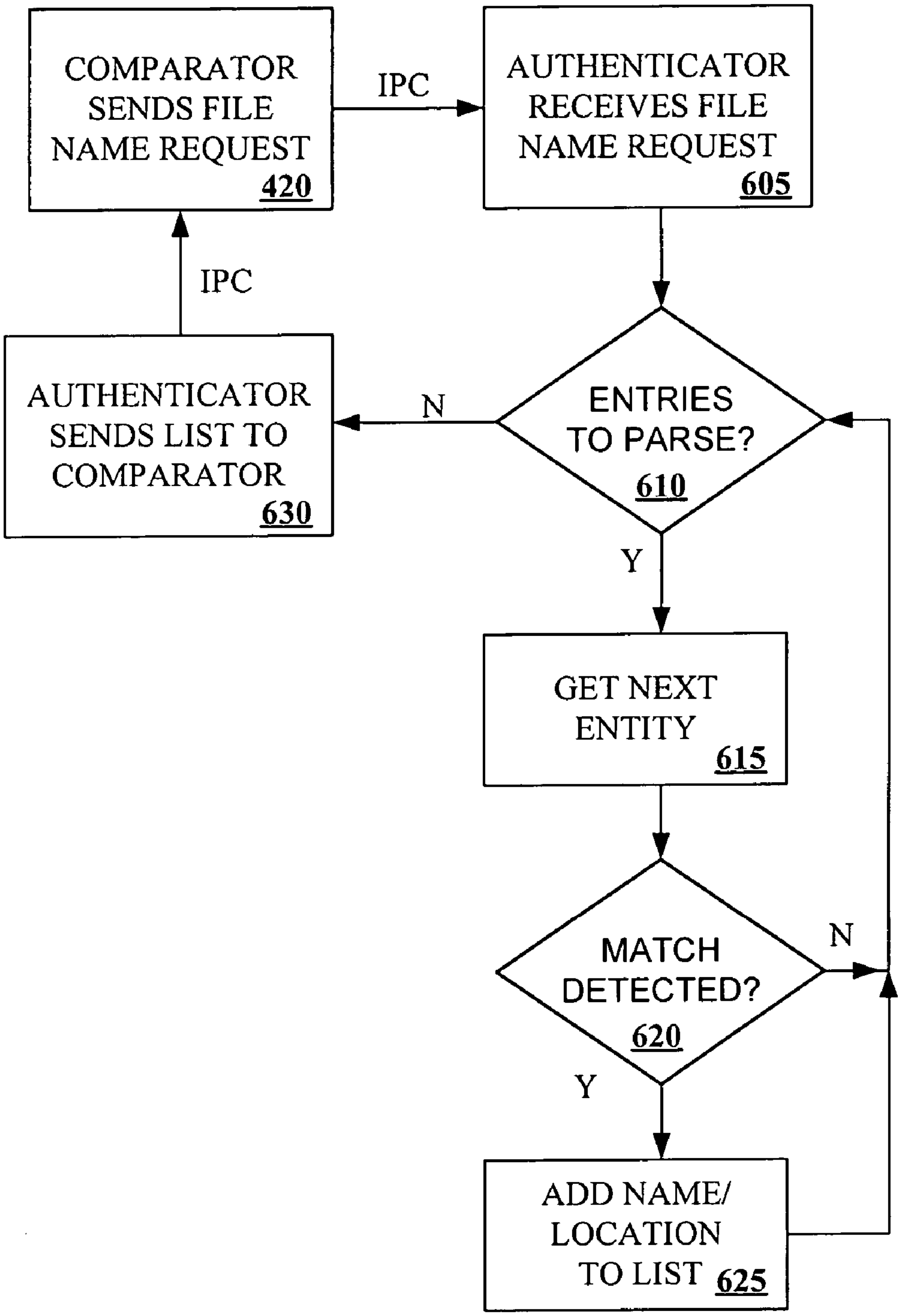
FIG. 6 is a flow chart depicting a method of locating authentic process files.
Figure 7:
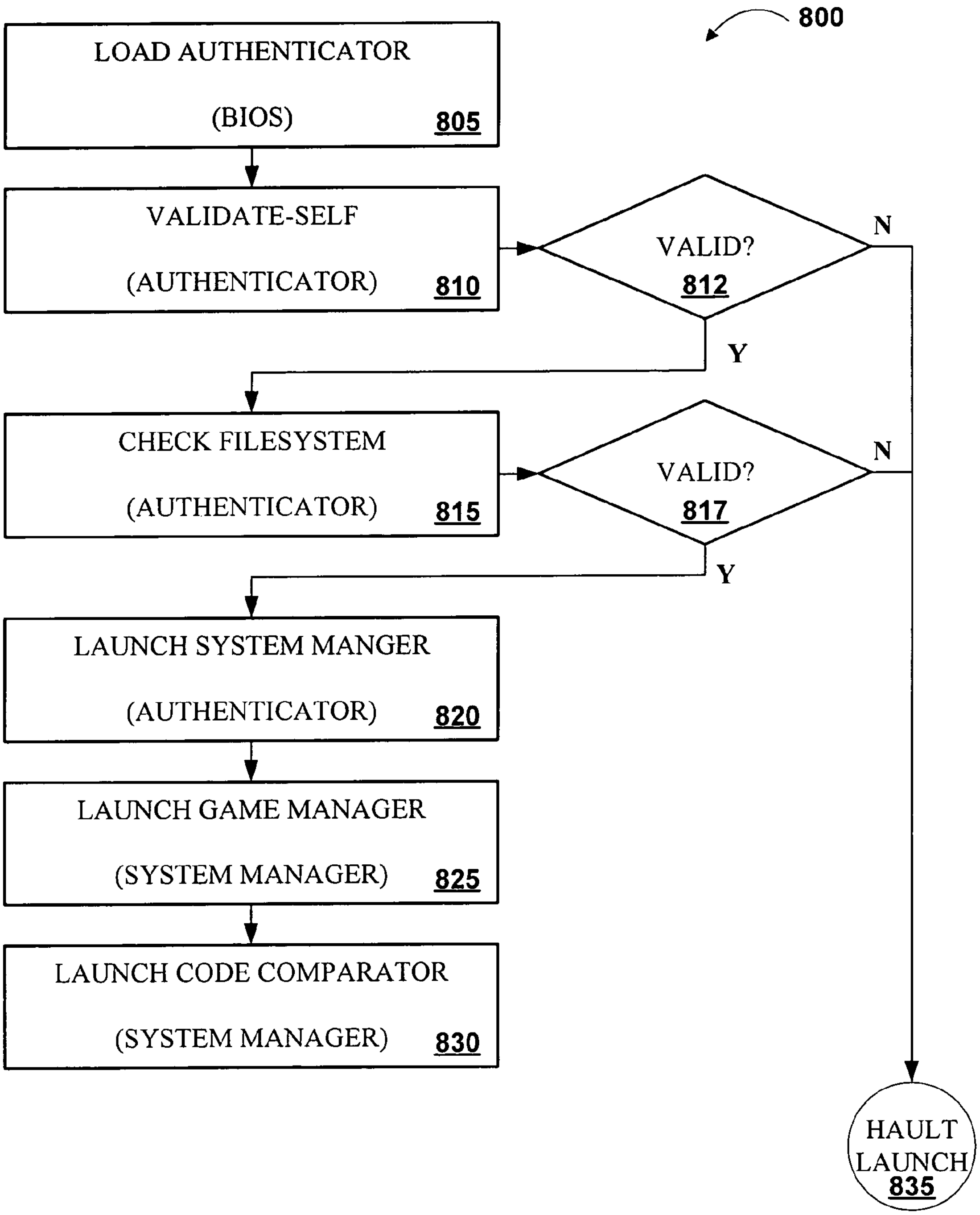
FIG. 7 is a flow chart depicting a method of initializing an authenticator and code comparator on a gaming machine.

The code authenticator, described in more detail with respect to FIGS. 6 and 7 locates on the file storage media an authentic copy of the gaming software being checked by the code comparator. During the boot process for the gaming machine 102 (see FIG. 7), the code authenticator may be loaded from an EPROM such as 104. The master gaming controller 101 executes various gaming software programs using one or more processors such as CPU 103. During execution, a software program may be temporarily loaded into the RAM 106. Depending on the current operational state of the gaming machine, the number types of software programs loaded in the RAM 106 may vary with time. For instance, when a game is presented, particular software programs used to present a complex graphical presentation may be loaded into RAM 106. However, when the gaming machine 102 is idle, these graphical software programs may not be loaded into the RAM.

The code comparator and code authenticator execute simultaneously with the execution of the other software programs on the gaming machine. Thus, the gaming machine is designed for "multi-tasking" i.e. the execution of multiple software programs simultaneously. The code comparator and code authenticator processes are most typically used to verify executable code. However, the present invention is not limited to the verification of executable code. It may also be applied to verify any data structures or other information loaded into RAM from mass storage devices used in the presentation of a game on a gaming machine or in any other gaming service provided by the gaming machine.

Details of gaming software programs that may be executed on a gaming machine and an object oriented software architecture for implementing these software programs are described in co-pending U.S. patent application Ser. No. 09/642,192, filed on Aug. 18, 2000 and entitled "Gaming Machine Virtual Player Tracking and Related Services," which is incorporated herein in its entirety and for all purposes and co-pending U.S. patent application Ser. No. 09/690,931 filed on Oct. 17, 2000 and entitled "High Performance Battery Backed Ram Interface" which is incorporated herein in its entirety and for all purposes.

Various gaming software programs, loaded into RAM 106 for execution, may be managed as "processes" by an operating system used on the gaming machine 102. The operating system may also perform process scheduling and memory management. An example of an operating system that may be used with the present invention is the QNX operating system provided by QNX Software Systems, LTD (Kanata, Ontario, Canada).

The code comparator may use information provided by the operating system, such as process information for processes scheduled by the operating system, to select gaming software executables for verification. The QNX operating system provides a list of process that are currently being executed on the gaming machine and information about each process (See FIG. 3). With QNX, the code comparator and code authenticator may be processes scheduled by the operating system.

The present invention is not limited to an operating system such as QNX. The code comparator may be used with other operating systems that provide information about the software programs currently being executed by the operating system and the memory locations of these software units during execution to verify the gaming software programs executing on the gaming machine. For instance, the code comparator may be used with Linux (Redhat, Durham, N.C.), which is an open source Unix based operating system, or Windows NT or MS Windows 2000 (Microsoft, Redmond, Wash.). Windows utilizes a RAM image on the hard drive to create a virtual paging system to manage executable code. The present invention may be applied to verify executable code managed by a virtual paging system. Further, the executable formats and dynamic link libraries between operating systems may vary. The present invention may be applied to different executable formats and link libraries used by a particular operating system and is not limited to the format and libraries of a particular operating system.

The code authenticator searches a file system available to the gaming machine for certified/authentic copies of gaming software programs currently being executed by the gaming machine. The file system may be distributed across one or more file storage devices. The certified/authentic copies of gaming software programs may be certified after a regulatory approval process as described above. The certified/authentic copies of gaming software programs may be stored in a "static" mode (e.g. read-only) on one or more file storage devices located on the gaming machine 102 such as file storage device 114 or EPROM 104. The file storage devices may be a hard-drive, CD-ROM, CD-DVD, static RAM, flash memory, EPROM's, compact flash, smart media, disk-on-chip, removable media (e.g. ZIP drives with ZIP disks, floppies or combinations thereof.

Figure 1C:
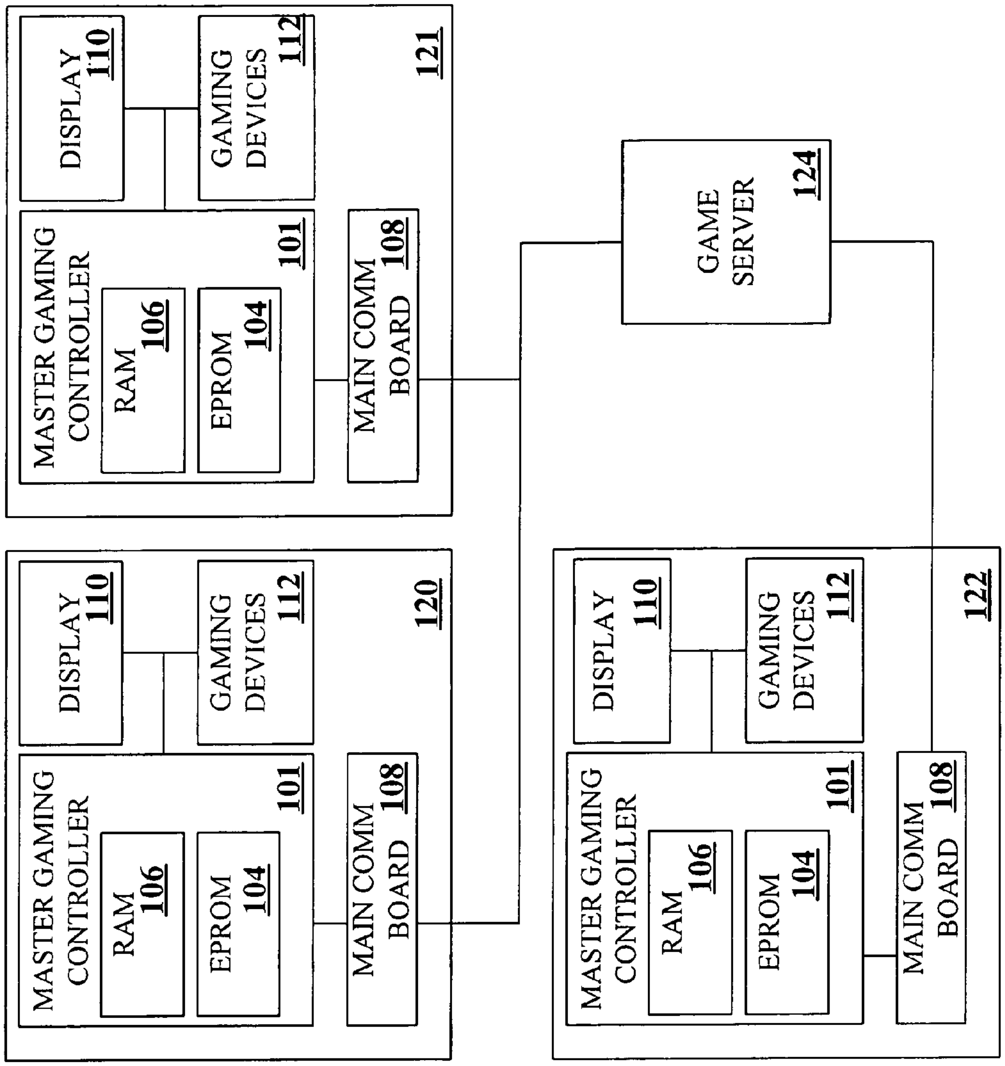
FIGS. 1B and 1C are block diagrams of gaming machines connected to remote storage devices.
Figure 1B:
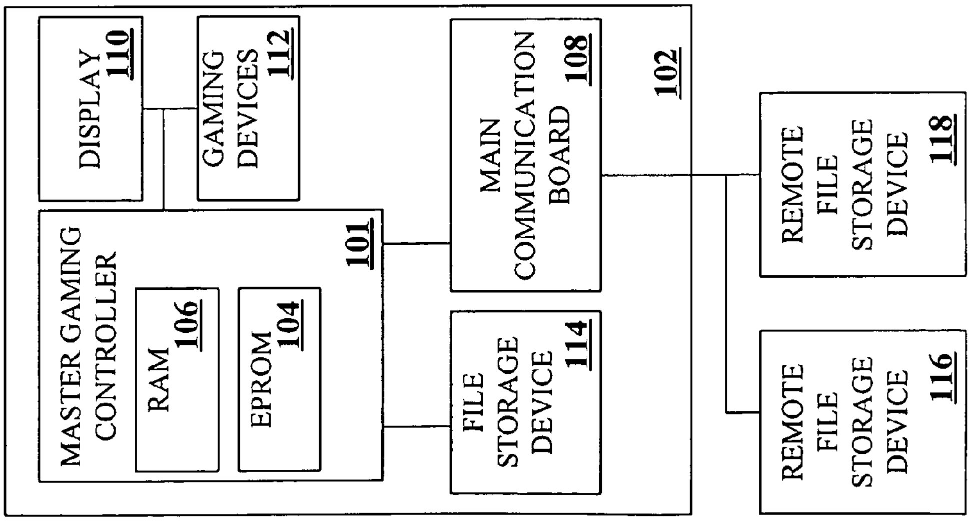

The file system used by the code authenticator may be distributed between file storage devices located on the gaming machine or on remote file storage devices. FIGS. 1B and 1C are block diagrams of gaming machines connected to remote storage devices. In FIG. 1B, gaming machine 102 is connected to two remote file storage devices 116 and 118. The code authenticator may search the two remote file storage devices 116 and 118 as well as local file storage device 114 for gaming software programs that correspond to gaming software programs currently scheduled for execution by the master gaming controller 101. Using a resource sharing system, a number of gaming software programs may be simultaneously scheduled for execution on the gaming machine at any one time. The resource sharing system, usually embedded in the operating system, develops a sequence order for executing the combination of gaming software programs. When the code authenticator returns a file name and file location (e.g. one of the file storage devices), the code comparator may compare portions of the software program being executed on the gaming machine with a corresponding software program stored one of the file storage devices. The gaming software programs identified by the code authenticator may be in an executable "object" format that includes programming instructions substantially identical to the format of the programming instructions executing on the gaming machine.

In one embodiment a majority of gaming software programs used on the gaming machine may stored on a remote device such as a game server. In FIG. 1C, three gaming machines, 120, 121 and 122 are connected to a game server 124. In this example, the gaming machines 120, 121 and 122 do not include a local file storage device such as a hard drive and gaming executables may be downloaded from the game server 124. The game server may be a repository for game software objects and software for other game services provided on the gaming machine. On each of the gaming machines 120, 121 and 122, the code comparator may compare software being executed by the gaming machine with certified/authentic code stored on the game server 124. One example of a game server that may be used with the present invention is described in co-pending U.S. patent application Ser. No. 09/042,192, filed on Jun. 16, 2000, entitled "Using a Gaming Machine as a Server" which is incorporated herein in its entirety and for all purposes. The game server might also be a dedicated computer or a service running on a server with other application programs.

One advantage of the code comparator and code authenticator of the present invention is that gaming software programs executed in a dynamic manner (e.g., different gaming software programs may be continually loaded and unloaded into memory for execution), may be regularly checked to insure the software programs being executed by the gaming machine are certified/authentic programs. The verification process may be used to ensure that approved gaming software is operating on the gaming machine, which may be necessary to satisfy gaming regulatory entities within various gaming jurisdictions where the gaming machine may operate. The gaming machine may be designed such that when uncertified/authentic programs are detected, an error condition is generated and the gaming machine shuts down. Thus, the present invention enables software architectures and hardware developed for personal computers to be applied to gaming machines.

As another advantage, the code comparator and authenticator may also be used to insure "rogue" programs are not operating on the gaming machine. For instance, one method previously used to tamper with a gaming machine might be to introduce a rogue program onto the gaming machine. For example, rogue programs have been used to trigger illegal jackpots on a gaming machine. The code comparator and authenticator may be used to detect these rogue programs and prevent tampering with the gaming machine.

Figure 2:
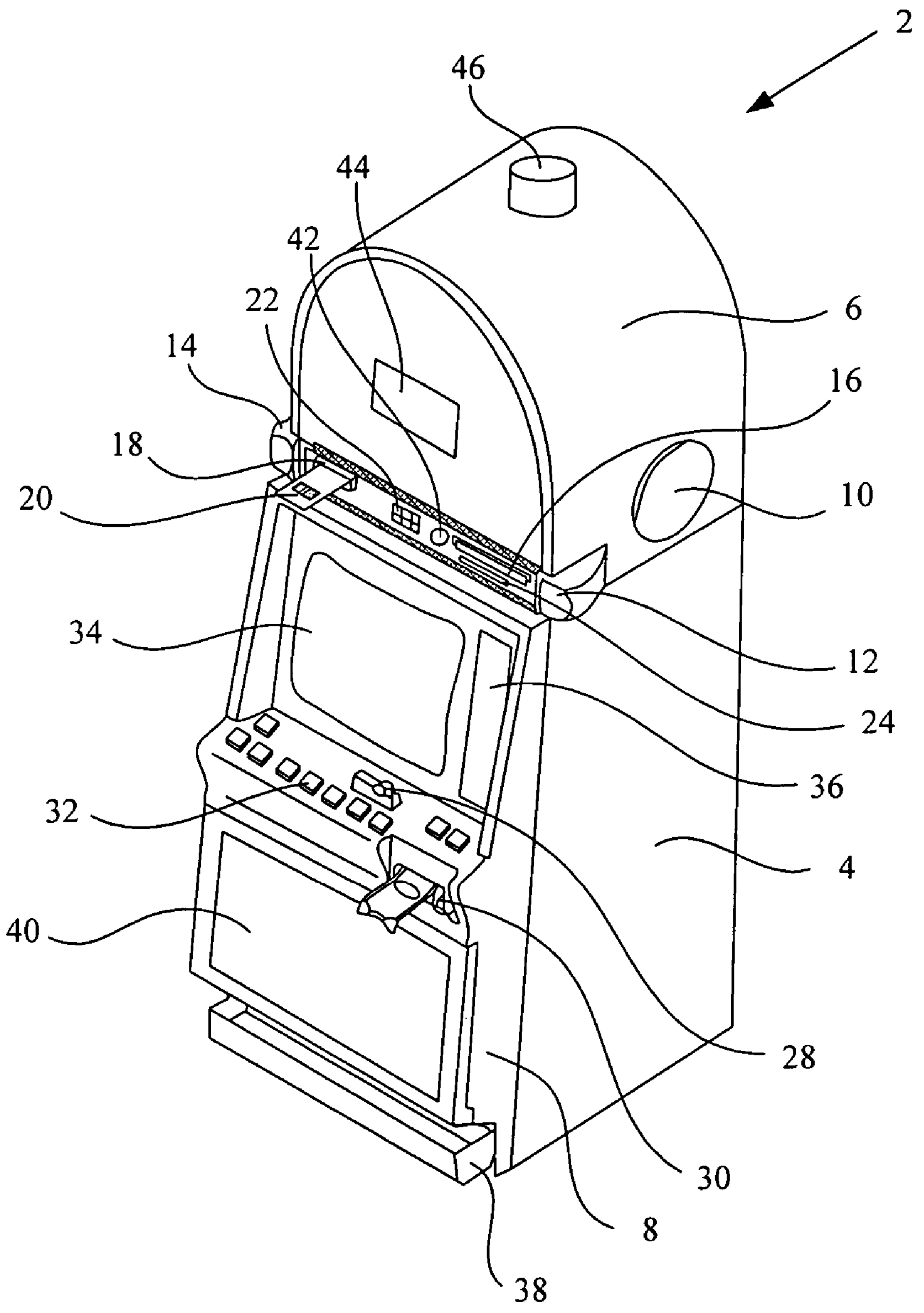
FIG. 2 is a perspective drawing of a gaming machine having a top box and other devices.

Turning to FIG. 2, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a belly glass 40. Viewable through the main door is a video display monitor 34 and an information panel 36. The display monitor 34 will typically be a cathode ray tube, high resolution flat-panel LCD, or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (See FIG. 1) housed inside the main cabinet 4 of the machine 2. Many possible games, including mechanical slot games, video slot games, video poker, video black jack, video pachinko, video bingo, video keno, video card games, lottery, and other games of chance may be provided with gaming machines of this invention.

The gaming machine 2 includes a top box 6, which sits on top of the main cabinet 4. The top box 6 houses a number of devices, which may be used to add features to a game being played on the gaming machine 2, including but not limited to: a) speakers 10, 12, 14, a ticket printer 18 which prints barcoded tickets 20, b) a key pad 22 for entering player tracking information such as an identification code, c) a florescent display 16 for displaying player tracking information, d) a card reader 24 for entering a magnetic striped card containing player tracking information or other input devices for entering player tracking information, e) a speaker/microphone for voice commands and voice recognition, f) biometric input devices such as finger printer for identifying a player, g) a video display screen 44 for displaying various types of video content such as player tracking information, machine status, bonus games and primary games and h) a lighted candle that may be used for signaling purposes such as to get the attention of various casino personnel. In some embodiments, some of these gaming devices may also be incorporated into the main cabinet of the gaming machine 2. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (See FIG. 2) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. As another example, a game may be generated on a host computer and may be displayed on a remote terminal or a remote computer. The remote computer may be connected to the host computer via a network of some type such as the Internet or an intranet. Those of skill in the art will understand that the present invention, as described below, can be deployed on most any gaming machine now available or hereafter developed.

The present invention is not limited to gaming machine and may be applied on other gaming devices executing gaming software from RAM. For example, the gaming devices may include player tracking devices mounted to the gaming machine, ticket validation systems, hand-held gaming devices and game servers. For example, as described, with respect to FIG. 1, a gaming machine may load gaming software applications from a remote game server in communication with the gaming machine. In this example, the game server and the gaming machine may apply the code comparator and code authenticator processes described in the present invention to verify game software and game data used to provide various gaming services. As another example, a player tracking unit mounted to the gaming machine may be used to provide a plurality of gaming services on the gaming machine. The player tracking unit may include a processor, RAM and mass storage device separate from the gaming machine. The present invention may applied on the player tracking unit to provided verification of gaming software executed on the player tracking unit.

The methods of the present invention may also be applied for remote checks of a gaming device. For example, in one embodiment, a gaming machine may verify the gaming software executing on a player tracking unit connected to the gaming machine. In another example, a game server may remotely verify the gaming software executing on one or more gaming machines in communication with the game server.

Returning to the example of FIG. 2, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 44 located in the top box 6.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

FIG. 3 is a block diagram of a gaming process file structure 300. As a player utilizes a gaming machine in the manner described above, many different software programs may be executed by the gaming machine. As different gaming software programs are executed by the gaming machine, an operating system running on the gaming machine assign the programs memory location in RAM and then schedule and track the execution of each program as "processes." The code comparator, which is itself a process, may be used to verify itself and the other processes being executed from RAM.

In one example, every time a process is launched in the operating system, a special directory, such as 310, 315, 320, 325 and 330, is created under the directory "/proc" 305 (e.g. the process directory) in the operating system. The name of this directory is identical to the process ID number (PID) of the process. For instance, process directories corresponding to process ID numbers "1", "2", "4049", "1234" and "6296" are stored under the "/proc" 305 directory. The process directories listed under the "/proc" directory 305 may vary as a function of time as different processes are launched and other process are completed.

In one embodiment, under each PID directory, such as 310, 315, 320, 325 and 330, an address space (AS) file, titled "AS", may be stored. The AS files, such as 335, 340, 345, 350 and 355 may contains various information about its parent process. Items stored in this file may include, among other things, the command line name used to launch the program and it's location in RAM (e.g. 350) and the names and location in RAM of the shared objects (so) that the process uses (e.g. 352, 354 and 356). A shared object is a gaming software program that may be shared by a number of other gaming software programs.

The shared objects used by a process on the gaming machine may vary with time. Thus, the number of shared objects such as 352, 354 and 356 used by a process may vary with time. For instance, a process for a game presentation on a gaming machine may launch various graphical shared objects and audio shared objects during the presentation of a game on the gaming machine and various combinations of these shared objects may be used at various times in the game presentation. For example, a shared object for a bonus game presentation on the gaming machine may only be used when a bonus game is being presented on the gaming machine. Hence, a process for a bonus game presentation may be launched when a bonus game presentation is required and the process may terminate when the bonus game presentation is completed. When the game presentation process uses the bonus game presentation shared object, the launching and the termination of the bonus game presentation shared object may be reflected in the AS file for the game presentation process.

The code comparator may use the AS files to determine which game related processes are currently being executed on the gaming machine. The code comparator may also be a process designated in the "/proc" directory 305. Also, in the "/proc" directory there may exist one or more directories that are not representations of process Ids. These include, but are not limited to, SELF, boot 330, ipstats, mount, etc. When parsing the "/proc" directory, these directories are skipped as they do not represent game related code. Once a valid directory is found, e.g., "4049" 320, it is opened and the "AS" file in it may parsed. A detailed method of using the "AS" file as part of a code validation/authentication process is described with respect to FIG. 4.

FIG. 4 is a flow chart depicting a method 400 of validating the authenticity of a process temporarily stored in RAM on a gaming machine using a code comparator process executed on the gaming machine for one embodiment of the present invention. As described above, the code comparator may be used with other operating systems which may affect the comparison process. Thus, the following example is provided for illustration purposes only.

In 401, the code comparator process is instantiated by the operating system. Various processes may be scheduled for execution on the gaming machine at the same time. Thus, the operating system determines the order in which to execute each process. An execution priority may be assigned to each process. Thus, processes with a higher priority will tend to execute before lower priority processes scheduled to run on the gaming machine.

In one embodiment, the code comparator process may be scheduled to run at a low priority where the comparator process may be automatically launched at regular intervals by the operating system. Therefore, during its execution, the code comparator may be preempted by other higher priority processes that may add/remove/reload additional processes. For this reason, the design of the code comparator may include methods to detect when the execution of the code comparator has been preempted and methods to respond to the addition/removal/reloading of processes that may have occurred while the code comparator was preempted.

In other embodiments, the code comparator may not always be a low-level process. During certain states of the gaming machine, the code comparator may be scheduled as a high priority process. For instance, when the code comparator has not been executed over a specific period of time, the priority of the code comparator may be increased until the process is completed. In another example, the code comparator may be launched and complete its tasks without interruption from other processes.

In 405, after the code comparator process has been launched, the comparator process begins to check each process instantiated by the operating system that is listed under the "/proc" directory as described with respect of FIG. 3. It is necessary that the code comparator can open the "/proc" directory. When it can not open the directory, an error is generated as described with respect to FIG. 5. The comparator may check PID directories in a certain range of integer values. PID directories within the range of integer values may correspond to gaming software programs verified by the code comparator while PID directories outside of the integer range may not be verified by the code comparator.

In 410, the code comparator opens the "AS" as described with respect to FIG. 3. When the "AS" file can not be opened, an error condition may be triggered. In 415, when the "AS"

file is opened, the code comparator parses process information such as an executable file name corresponding to the process and a temporary memory location of the process in RAM. In addition, the code comparator may parse from the "AS" file the executable file names and temporary memory locations of the processes in RAM for one or more shared objects used by the process. When information from the "AS" file can not be obtained by the code comparator a number of error conditions may be triggered. Further details of 410 and 415 involving opening and parsing the "AS" file are described with respect to FIG. 5.

In 420, when the code comparator process has obtained a file name corresponding to the process in the "AS" file, the location of the file is requested from the code authenticator via an inter process communication (IPC) from the code comparator. IPCs allow processes instantiated by the operating system to share information with one another. When asking the code authenticator for the location(s) of a given file, the full file name and a vector of string pointers, i.e., vector <String *>, are passed. The code authenticator application program interface (API) fills the vector with a list of paths to file locations corresponding to the file name received from code authenticator and returns the vector to the code comparator via an IPC. The list of paths correspond to matching files found on the file storage media (for example, see FIGS. 1A, 1B and 1C) searched by the code authenticator. If no matches are found, the vector returned by the authenticator is empty or may contain an error message. Details of one search method used by the code authenticator is described with respect to FIG. 6.

In 425, the code comparator examines the vector returned by the code authenticator. When the vector is empty, the process identified by the code comparator may be considered a rogue process. In 430, an error condition, such as "file not found", may be reported by the code comparator. The error condition may cause the system manager on the gaming machine to take an action such as shutting down, rebooting, calling an attendant, entering a "safe" mode and combinations thereof.

In 435, operating instructions temporarily stored in RAM corresponding to a process executing on the gaming machine are compared with a certified/authentic operating instructions stored in a file located by the code authenticator. In the operating system for one embodiment of the present invention, files are stored using an Executable and Linking Format (ELF). Details of the ELF format are described as follows and then a comparison by the code comparator of operating instructions for a process stored in RAM with operating instructions stored in a corresponding ELF file are described.

There are three ELF file types: 1) executable, 2) relocatable and 3) shared object. Of these three, only the executable and shared object formats, which may be executed by the operating system, are used by the code comparator. There are five different sections that may appear in any given ELF file including a) an ELF header, b) a program header table, c) section header table, d) ELF sections and e) ELF segments. The different sections of the ELF file are described below.

The first section of an ELF file is always the ELF Header. It is the only section that has a fixed position and is guaranteed to be present. The ELF header has three tasks: 1) it details the type of file, target architecture, and ELF version, 2) it contains the location within the file of the program headers, section headers, and string tables as well as their size and 3) it contains the location of the first executable instruction.

The Program Header Table is an array of structures that can each describe either a segment in the file or provide information regarding creating an executable process image. Both the size of each entry in the program header table and the number of entries reside in the ELF header. Every entry in the program header table includes a type, a file offset, a physical and virtual addresses, a file size, a memory image size and a segment alignment. Like the program header table, the section header table contains an array of structures. Each entry in the section header table contains a name, a type, a memory image starting address, a file offset, a size an alignment and a section purpose. For every section in the file, a separate entry exists in the section header table.

Nine different ELF section types exist. These consist of executable, data. dynamic linking information, debugging data, symbol tables, relocation information, comments, string tables and notes. Some of these types are loaded into the process image, some provide information regarding the building of the process image, and some are used when linking object files. There are three categories of ELF segments: 1) text, 2) data and 3) dynamic. The text segment groups executable code, the data segment groups program data, and the dynamic segment groups information relevant to dynamic loading. Each ELF segment consists of one or more sections and provide a method for grouping related ELF sections. When a program is executed, the operating system interprets and loads the ELF segments to create a process image. If the ELF file is a shared object file, the operating system uses the segments to create the shared memory resource.

In 435, the comparison process may include first verifying the ELF header and then verifying the program blocks. When a program is temporarily loaded in RAM as a process, only the program blocks that are marked as loadable and executable in the ELF file will exist in RAM and, therefore, are the only ones verified.

To validate a process loaded in RAM, the code comparator opens a file on the storage device where the file is located. The code comparator begins with the first file in the vector of file paths sent to the code comparator by the code authenticator. In 415, the RAM address of the loaded process is obtained from "AS" when the "AS" file is parsed. The RAM address marks the start of the loaded ELF header. The loaded ELF header is verified against the corresponding ELF header from the file on the storage device. Since the size of the ELF header is fixed, this comparison is a straight forward byte comparison. If the ELF header matches, the program blocks are then checked.

The code comparator may consider two things when comparing ELF program blocks. First, what program blocks were loadable and/or executable and second, where do each of the program blocks reside in RAM. The number of program headers resides in the ELF header. Each of these headers, in turn, contains the offset to the code block that they represent as well as whether or not it is loadable or executable.

The starting address for where, in RAM, the code exists, resides in the "AS" file. This is the same for the file except that the starting address of the file pointer is used to determine the start of the program. All executable/loadable program blocks in RAM are compared against the file stored on the storage media. Data blocks which may vary as the program is executed are not usually checked. However, in some programs, "fixed" or static data blocks may be checked by the code comparator. In one embodiment, when all blocks check out, the comparison is deemed successful. In another embodiment, only a portion of the program blocks may be checked by the code comparator. To decrease the time the comparison process takes, partial or random section portions of code may be compared. In one embodiment, a bit-wise comparison method is used to compare code. However, the method is not limited to a bit-wise comparison other comparison methods may be used or combinations of comparison methods may be used.

During the file comparison process, a mismatch may result from several different conditions including but not limited to the conditions described as follows. First, it is possible that the code comparator was pre-empted and that the process that is currently being verified was terminated. Second, it is also possible that the RAM contents or file contents for the process in question may have been corrupted. Third, the file being compared could have the same name as the file used to launch to process but not actually be the same file. This condition may occur when the code authenticator returns a vector with multiple file paths corresponding to the file name sent to the code authenticator by the code comparator. Fourth, the process executing in RAM may have been altered in some manner in an attempt to tamper with the gaming machine.

In 440, the code comparator checks the status of the RAM and file compare process. In 445, when the compare is accepted (the conditions for accepting the compare may be varied), the code comparator begins to check any shared objects for the process obtained from the "AS" file. When the process does not use shared objects, the code comparator continues to the next PID directory in 405. When the process is using one or more shared objects, the code comparator sends a request to the code authenticator to find file locations corresponding to the file name for the shared object in 420.

In 442, when a mismatch occurs, to determine whether the process has terminated, the "AS" file for the process is re-parsed and the newly obtained contents are compared against the original contents obtained initially. When the "AS" file is no longer accessible, the process was terminated during the compare process and the comparison is aborted and an error condition is not generated. When the "AS" file can be re-parsed but the file name stored within the "AS" file has changed, then the original process may been terminated and a new process may have been started with the same process identification number (PID). In this case, the comparison process is aborted and error condition is not generated.

In 445, when the newly obtained contents from the "AS" file match the original contents of the "AS" file in 442, the comparison process continues with the next file from the matching file list in the vector that was obtained via the code authenticator process. When the code comparator reaches the end of this vector list without matching the process, a rogue process may be running and an error condition is reported in 450 to the system manager. In 440, when a comparison fails because of a RAM and/or file corruption, the comparator may check whether the process has terminated in 442 and continue to the next the file in the authenticator file list in 445. Once the end of the authenticator file list is reached, the comparator will declare a rogue process and report the error in 450.

FIG. 5 is a flow chart depicting a method of parsing an address space (AS) file as described with respect to 410 and 415 in FIG. 4. The method is presented for illustrated purposes as it is specific to the QNX operating system. A similar method may be developed for different operating systems such as Linux or Windows NT. In 500, the code comparator attempts to open the process directory ("/proc" as described with reference to FIG. 3), which is provided by the operating system and contains a list of all the processes currently scheduled for execution. In 505, when the process directory can not be opened, an error is sent by the code comparator to the system manager indicating the process directory can not opened. In one example, the process directory as well as other directories below the process directory may be inaccessible because an access privilege has been set on the directory that prevents access by the code comparator. Access privileges for directories are well know in UNIX based operating systems such as QNX.

In 510, when the process directory can be opened, the code comparator selects the next directory in the list of PID directories under the process directory. The PID directories are listed as integers. The code comparator, which may be repeatedly preempted by other process while performing the code comparison, stores which integer PID it is currently comparing and then proceeds to the next closet integer after the compare on the current process is completed. In 515, the code comparator compares the selected integer PID number with a range of integers. Not all processes are necessarily compared by the code comparator. In general, only processes within a particular numerical range corresponding to gaming software that has been certified are verified by the code comparator. When the PID directory number does not fall within the range of integers checked by the code comparator or the PID directory has a text name, such as boot, the code comparator proceeds to the next PID directory in the process directory in 510.

When the PID directory is within the integer range of processes which the code comparator checks, in 520, the code comparator attempts to open the PID directory. In 521, when the PID directory can not be opened, the comparator determines whether the process was terminated by the operating system. When the process was terminated by the operating system, the code comparator moves to the next directory in the process directory in 510. In 522, when the PID directory can not be opened and the process was not terminated by the operating system, an error message is posted to the operating system. A way of tampering with the gaming machine may be to generate a process that can not be checked by the code comparator.

In 525, when the PID directory can be opened, the code comparator attempts to open the Address Space (AS) file as described with reference to FIG. 2. The "AS" file may contain a process memory address location, a process executable file name, shared object memory address locations used by the process and shared object executable file names corresponding to the shared objects. In 540, the code comparator attempts to read the "AS" file. In 550, when the file is readable, the code comparator continues with the comparison process according to 420 in FIG. 4.

In 540 when the code comparator can not get information from the "AS" file, the code comparator checks for the "Error for Search (ESRCH)" error condition in 545. The error code ESRCH is returned when the requested file does not exist and indicates that the process the code comparator was trying to access was removed. When the code comparator detects this error code, the error is ignored and the code comparator continues to the next PID directory in 510. In 555, when an ERSCH error condition is not detected, an error message is sent to the system manager indicating the "AS" file can not be parsed. The "AS" may not be parsable for a number of reasons. For instance, the data in the "AS" may have been corrupted in some manner that prevents the code comparator from reading the file.

In 525 when the "AS" can not be opened, only one error code, "Error No Entry (ENOENT)" is tolerated. The ENOENT error code is returned when the requested file does not exist. It indicates that the process the code comparator was trying to access was removed by the operating system. In 530, the code comparator checks for the ENOENT code. When an ENOENT error code has been generated, the code is ignored and the code comparator moves on to the next PID directory in 510. The ENOENT code may have been generated because the code comparator was preempted during its operation by the execution of one or more higher priority processes. While the higher priority processes were being executed, the process that the code comparator was checking may have been terminated. When any other error code is detected by the code comparator, in 535 an error message is sent to the operating system indicating that the "AS" can not be opened. For instance, the "AS" file may exist but the code comparator may not have the access privilege to open the file which would generate an error condition other than ENOENT and hence an error condition in 535.

FIG. 6 is a flow chart depicting a method of locating authentic process files. In 420, as described above, the comparator sends a file name request via an interprocess communication to the code authenticator. In 605, via the code authenticator application program interface, the code authenticator receives a file name. The code authenticator searches through a list of file names where each file name corresponds to certified executable gaming software program. The certified gaming software programs may be stored on storage media, i.e. one or more file storage devices, located within the gaming machine, located outside of the gaming machine or combinations thereof. A portion of the certified executable gaming software programs may have been approved by a gaming regulatory agency in a gaming jurisdiction for use on gaming machines in the gaming jurisdiction. In cases where a gaming jurisdiction does not require certification of a particular software program, the gaming software program may also be certified as authentic by the gaming manufacturer for security reasons. Further details of code authenticator application may be found in co-pending U.S. application Ser. No. 09/643,388, filed on Aug. 21, 2000, by LeMay, et al., "Method and Apparatus for Software Authentication" which is incorporated in its entirety and for all purposes.

In 610, the code authenticator determines whether it has reached an end of the list of certified file names. When the code authenticator has not reached the end of the list, in 615, the code authenticator gets the next file name of the list. In 620, when the name from the list matches the name received from the code comparator, the path to the file, which may be the location of the file in a file structure stored on a file storage device, is added to a list of matched files detected by the code comparator.

The list of matched files is stored in a vector which may contain zero files when no files have been matched to a plurality of files when multiple matches have been detected by the code comparator. In the case where multiple matches have been detected, the multiple files may reside on a common file storage device or the multiple files may reside on different file storage devices. In 620, when a match is not detected, the code authenticator checks the next file entity on the list for a match. In 630, after the entire list of certified file names has been searched, the authenticator sends a vector, which may be empty, containing a list of matches detected by the code authenticator, to the code comparator via an IPC.

FIG. 7 is a flow chart depicting a method 800 of initializing an authenticator and code comparator on a gaming machine. In 805, the code authenticator is loaded by the BIOS from an EPROM (see FIGS. 1A-1C). The code authenticator may be stored on an EPROM for security and gaming approval reasons. The EPROM storing the code authenticator can be submitted for approval to a gaming jurisdiction. Once the EPROM has been approved, as was previously described, a unique signature may be generated for the EPROM. The unique signature may be checked when the EPROM is installed on the gaming machine in the local gaming jurisdiction. Since software stored on the EPROM is generally difficult to alter, the use of the EPROM may also prevent tampering with the gaming machine.

In 810, after the code authenticator has been loaded from the EPROM, the code authenticator may validate itself. For instance, a CRC may be performed on the authenticator software to obtain a CRC value. The CRC value may be compared with a certified CRC value stored at some location on the gaming machine. In 812, the validation check is performed. When the authenticator is not valid, the initialization of the gaming machine is halted in 835 and the gaming machine may be shutdown or placed in a safe mode. In 815, the code authenticator may compare a list of certified software programs stored in the EPROM with a list of software programs available on the gaming machine. As an example, the EPROM may contain about 1 Megabyte of memory available for storage purposes but is not limited to this amount. The code authenticator may also perform other files system checks.

In 817, file system has not been validated, the launch of the gaming machine is halted and the gaming machine may be shutdown or placed in a safe mode in 835. In 817, when the file system has been validated, the system manager is launched in 820. In 825 and 830, the system manager launches the game manger and the code comparator. Once the code comparator is launched, it continually runs in the background preferably as a task in a "multi-tasking system."

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A method of verifying the authenticity of a process stored in RAM of a gaming machine having a master gaming processor for executing said process, the method comprising:

identifying one or more processes scheduled for execution on the gaming machine RAM;

selecting a first process of the one or more processes for verification;

determining a first identifier associated with the selected first process;

identifying a first portion of code of the first process that does not change during execution of the first process, the first portion of code comprising a first portion of bits;

identifying, using the first identifier, one or more gaming software programs stored at one or more one file storage devices, wherein each of the one or more gaming software programs has associated therewith a respective identifier which matches the first identifier;

performing verification analysis of the first process to determine whether any of the identified one or more gaming software programs includes code which matches the first portion of code of the selected first process;

wherein the verification analysis includes identifying one or more portions of code associated with at least one of the identified one or more gaming software programs, wherein none of the identified one or more portions of code changes during execution of the at least one of the identified one or more gaming software programs, each of the identified one or more portions of code having associated therewith a respective portion of bits;

wherein the verification analysis further includes comparing bits of the first portion of code and bits of the identified one or more portions of code to determine whether any portion of bits of the identified one or more portions of code matches the first portion of bits of the first portion of code; and generating an error event if it is determined that none of the compared portion of bits of the identified one or more portions of code matches the first portion of bits of the first portion of code.

2. The method of claim 1 further comprising:

parsing a selected first gaming software program to distinguish between portions of the selected first gaming software program which do not change during execution of the selected first gaming software program and portions of the selected first gaming software program which do change during execution of the selected first gaming software program.

3. The method of claim 1 further comprising:

parsing the selected first process to distinguish between portions of the first process which do not change during execution of the first process and portions of the first process which do change during execution of the first process.

4. The method of claim 1 wherein the first portion of the selected first process includes a first portion of executable code relating to the selected first process.

5. The method of claim 1 wherein the comparison of the first portion of the first process and the selected first gaming software program includes:

comparing the first portion of the first process and the identified one or more portions of code in order to determine whether the identified one or more portions of code includes the first portion of the selected first process.

6. The method of claim 1:

wherein the first portion of the selected first process includes a first portion of executable code relating to the selected first process; and wherein the verification analysis includes comparing the first portion of executable code and the identified one or more portions of code in order to determine whether the identified one or more portions of code includes the first portion of executable code.

7. The method of claim 1 wherein the comparing of bits of the first portion of executable code and bits of the identified one or more portions of code includes performing a byte-comparison of the first portion of the first process and the identified one or more gaming software programs.

8. The method of claim 1, wherein the one or more gaming software programs are certified for execution on the gaming machine in one or more gaming jurisdictions by a regulatory entity within each of the gaming jurisdictions.

9. The method of claim 1, further comprising:

controlling a wager-based game played on the gaming machine.

10. The method of claim 9, wherein the wager-based game corresponds to a game selected from a group consisting of:

a video slot game, a mechanical slot game, a lottery game, a video poker game, a video black jack game, a video card game, a video bingo game, a video keno game and a video pachinko game.

11. The method of claim 1, wherein the one or more file storage devices include at least storage device selected from a group consisting of: a local file storage devices located at the gaming machine, and a remote file storage device located at a remote system.

12. The method of claim 1, further comprising:

shutting down the gaming machine if it is determined that none of the identified one or more gaming software programs includes the first portion of the selected first process.

13. The method of claim 1, wherein a list of the one or more processes scheduled for execution on the gaming machine RAM is provided by an operating system.

14. A system of verifying the authenticity of a process stored in RAM of a gaming machine having a master gaming processor for executing said process, the system comprising:

at least one processor;

at least one interface; and memory;

the system being operable to:

identify one or more processes scheduled for execution on the gaming machine RAM;

select a first process of the one or more processes for verification;

determine a first identifier associated with the selected first process;

identify a first portion of code of the first process that does not change during execution of the first process, the first portion of code comprising a first portion of bits;

identify, using the first identifier, one or more gaming software programs stored at one or more one file storage devices, wherein each of the one or more gaming software programs has associated therewith a respective identifier which matches the first identifier;

perform verification analysis of the first process to determine whether any of the identified one or more gaming software programs includes code which matches the first portion of code of the selected first process;

identify one or more portions of code associated with at least one of the identified one or more gaming software programs, wherein none of the identified one or more portions of code changes during execution of the at least one of the identified one or more gaming software programs, each of the identified one or more portions of code having associated therewith a respective portion of bits;

compare bits of the first portion of code and bits of the identified one or more portions of code to determine whether any portion of bits of the identified one or more portions of code matches the first portion of bits of the first portion of code; and generate an error event if it is determined that none of the compared portion of bits of the identified one or more portions of code matches the first portion of bits of the first portion of code.

15. The system of claim 14 being further operable to:

parse the selected first gaming software program to distinguish between portions of a selected first gaming software program which do not change during execution of the selected first gaming software program and portions of the selected first gaming software program which do change during execution of the selected first gaming software program.

16. The system of claim 14 being further operable to:

parse the selected first process to distinguish between portions of the first process which do not change during execution of the first process and portions of the first process which do change during execution of the first process.

17. The system of claim 14 wherein the first portion of the selected first process includes a first portion of executable code relating to the selected first process.

18. The system of claim 14 being further operable to:

compare the first portion of the first process and the identified one or more portions of code in order to determine whether the identified one or more portions of code includes the first portion of the selected first process.

19. The system of claim 14 wherein the first portion of the selected first process includes a first portion of executable code relating to the selected first process, the system being further operable to:

compare the first portion of executable code and the identified one or more portions of code in order to determine whether the identified one or more portions of code includes the first portion of executable code.

20. The system of claim 14 wherein the comparing of bits of the first portion of executable code to bits of the identified one or more portions of code includes performing a byte-comparison of the first portion of the first process and the identified one or more gaming software programs.

21. The system of claim 14, wherein the one or more gaming software programs are certified for execution on the gaming machine in one or more gaming jurisdictions by a regulatory entity within each of the gaming jurisdictions.

22. The system of claim 14, being further operable to:

control a wager-based game played on the gaming machine.

23. The system of claim 22, wherein the wager-based game corresponds to a game selected from a group consisting of:

a video slot game, a mechanical slot game, a lottery game, a video poker game, a video black jack game, a video card game, a video bingo game, a video keno game and a video pachinko game.

24. The system of claim 14, wherein the one or more file storage devices include at least storage device selected from a group consisting of: a local file storage devices located at the gaming machine, and a remote file storage device located at a remote system.

25. The system of claim 14, being further operable to:

shut down the gaming machine if it is determined that none of the identified one or more gaming software programs includes the first portion of the selected first process.

26. The system of claim 14, wherein a list of the one or more processes scheduled for execution on the gaming machine RAM is provided by an operating system.

27. A system of verifying the authenticity of a process stored in RAM of a gaming machine having a master gaming processor for executing said process, the system comprising:

at least one processor;

memory;

means for identifying one or more processes scheduled for execution on the gaming machine RAM;

means for selecting a first process of the one or more processes for verification;

means for determining a first identifier associated with the selected first process;

means for identifying a first portion of code of the first process that does not change during execution of the first process, the first portion of code comprising a first portion of bits;

means for identifying, using the first identifier, one or more gaming software programs stored at one or more one file storage devices, wherein each of the one or more gaming software programs has associated therewith a respective identifier which matches the first identifier;

means for performing verification analysis of the first process to determine whether any of the identified one or more gaming software programs includes code which matches the first portion of code of the selected first process;

means for identifying one or more portions of code associated with at least one of the identified one or more gaming software programs, wherein none of the identified one or more portions of code changes during execution of the at least one of the identified one or more gaming software programs, each of the identified one or more portions of code having associated therewith a respective portion of bits;

means for comparing bits of the first portion of code and bits of the identified one or more portions of code to determine whether any portion of bits of the identified one or more portions of code matches the first portion of bits of the first portion of code; and means for generating an error event if it is determined that none of the compared portion of bits of the identified one or more portions of code matches the first portion of bits of the first portion of code.

* * * * *

UNITED STATES PATENT AND TRADEMARK OFFICE

CERTIFICATE OF CORRECTION

PATENT NO. : 7,581,256 B2 
APPLICATION NO. : 10/680041
DATED : August 25, 2009
INVENTOR(S) : Cockerille et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Fourteenth Day of September, 2010

David J. Kappos
*Director of the United States Patent and Trademark Office*